United States Patent [19]

Kretser, Jr.

[11] Patent Number: 5,809,614
[45] Date of Patent: Sep. 22, 1998

[54] PIVOTING FOREARM CRADLE FOR WEED TRIMMING DEVICE

[76] Inventor: Karl D. Kretser, Jr., 9327 Monhegan Ave., Baker, La. 70714

[21] Appl. No.: 758,711

[22] Filed: Dec. 3, 1996

[51] Int. Cl.$^6$ .................................................. A47B 95/02
[52] U.S. Cl. ................................... 16/114 R; 16/DIG. 41
[58] Field of Search ............................ 16/114 R, 110 A, 16/110 R, 111 R, 112, 116, DIG. 39, DIG. 38, DIG. 40, DIG. 41; 43/25; 30/102, 295, 291, 296.1, 298, 312; 294/57, 58, 59; 403/256, 257, 260

[56] References Cited

U.S. PATENT DOCUMENTS

| | | | |
|---|---|---|---|
| 3,159,939 | 12/1964 | Transeau | 43/25 |
| 3,367,056 | 2/1968 | Johnson | 43/25 |
| 4,050,728 | 9/1977 | Davidson | 294/58 |
| 4,225,104 | 9/1980 | Larson | 16/114 R |
| 4,282,652 | 8/1981 | Ballas, Sr. | 30/276 |
| 4,619,047 | 10/1986 | Heckman | 30/276 |
| 4,658,507 | 4/1987 | Hazen | 30/295 |
| 5,031,323 | 7/1991 | Honsa et al. | 30/276 |
| 5,159,775 | 11/1992 | Sutula, Jr. | 294/58 |
| 5,265,341 | 11/1993 | Kikuchi | 30/276 |
| 5,313,735 | 5/1994 | Latouche | 16/114 R |

FOREIGN PATENT DOCUMENTS

| | | | |
|---|---|---|---|
| 353677 | 7/1931 | United Kingdom | 16/110 A |

*Primary Examiner*—Chuck Mah
*Attorney, Agent, or Firm*—Joseph N. Breaux

[57] ABSTRACT

A pivoting forearm cradle including a contoured forearm receiving and supporting structure and a pivotal connecting structure that is in connection with the forearm receiving and support structure at one end thereof and attachable to the drive shaft assembly of a weed trimming device. The forearm receiving and support structure is preferably a contoured cradle having a forearm receiving surface contoured to receive and shield the forearm of a user. The pivotal connecting structure preferably includes a user adjustable tensioning mechanism to allow the user to adjust the force required to cause the forearm receiving and support structure to pivot. The tensioning mechanism preferably includes a wave spring positioned between a pivot plate and a clamping bracket that form a portion of the pivotal connecting structure. In addition, it is preferred to provide one or more pivot stops to limit the range of angular motion between the forearm receiving and support structure and the drive shaft assembly of the weed trimming device.

1 Claim, 2 Drawing Sheets

PIVOTING FOREARM CRADLE FOR WEED TRIMMING DEVICE

TECHNICAL FIELD

The present invention relates to handles and support structures for lawn care tools and more particularly to a forearm cradle for a weed trimming device, such as a string trimmer, that includes a contoured forearm receiving and supporting structure that is secured and pivotally mounted to the elongated drive shaft assembly of the weed trimming device with a pivotal connection having a pivoting range defined between a first and second angle with respect to the elongated drive shaft assembly.

BACKGROUND OF THE INVENTION

Weed and grass trimmers having elongated drive shaft assemblies have become common lawn care tools. These trimmers generally consist of a motor assembly, such as a gas engine or electric motor; an elongated drive shaft assembly, in connection with the motor assembly at one end thereof; and a cutting head, such as a string feed assembly or rotary cutting wheel, in connection with the other end of the drive shaft assembly. A trigger type control, a handle, and an over the shoulder support strap are generally provided on or connected to the elongated drive shaft assembly to provide the user with support and control mechanisms for the trimmer during use. Although conventional handles and over the shoulder straps provide the user with a mechanism for supporting the weed trimmer, they do not provide the type of strain relieving support structure for the forearm of the user that is desirable for individuals who use the weed trimmer for extended periods, such as individuals required to trim large areas or who use a weed trimmer daily. It would, therefore, be a benefit to these individuals to have a forearm support structure, such as a forearm cradle, in connection with the drive shaft assembly of a weed trimmer that provided support for and cradled the forearm of the user. Although forearm cradles have been provided on some weed trimmers, the placement and attachment of these cradles to the motor assembly results in decreased maneuverability of the weed trimmer. It would, therefore, also be desirable to have a forearm support structure for a weed trimmer that included a pivoting mechanism that allowed the forearm support structure to pivot with respect to the elongated drive shaft of the weed trimmer to allow the user to maneuver the weed trimmer as required to perform weed and grass trimming while comfortably maintaining his/her forearm in the forearm support structure.

In addition, conventional handles and over the shoulder straps do not provide a shield between the user and the motor assembly to shield the user from burns to the forearm area that can result from contact with a hot motor assembly. It would, therefore, be a further benefit to have a forearm support structure that served the additional purpose of shielding the forearm of the user from the motor assembly of the weed trimmer to prevent the occurrence of burns.

SUMMARY OF THE INVENTION

It is thus an object of the invention to provide a forearm cradle that provides support for and cradles the forearm of the user while using a weed trimmer.

It is a further object of the invention to provide a forearm cradle that provides support for and cradles the forearm of the user while using a weed trimmer that has an attachment mechanism for connecting the forearm cradle with the drive shaft assembly of the weed trimmer.

It is a further object of the invention to provide a forearm cradle for a weed trimmer having an elongated drive shaft assembly that includes a pivoting mechanism that allows the forearm cradle to pivot with respect to the elongated drive shaft when in use.

It is a further object of the invention to provide a forearm cradle for a weed trimmer having an elongated drive shaft assembly that includes a pivoting mechanism that includes a tensioning mechanism that allows the user to adjust the force required to cause the forearm cradle to pivot with respect to the elongated drive shaft.

It is a still further object of the invention to provide a forearm cradle for a weed trimmer having an elongated drive shaft assembly coupled to a motor assembly at one end thereof that includes a shielding surface for shielding the forearm of the user from contact with the motor assembly during use.

It is a still further object of the invention to provide a forearm cradle for a weed trimmer having an elongated drive shaft assembly that accomplishes some or all of the above objects in combination.

Accordingly, a pivoting forearm cradle for weed trimming devices is provided. The pivoting forearm cradle includes a contoured forearm receiving and supporting structure and a pivotal connecting structure that is in connection with the forearm receiving and support structure at one end thereof and attachable to the drive shaft assembly of a weed trimming device. In a preferred embodiment the forearm receiving and support structure is a contoured cradle having a forearm receiving surface contoured to receive and shield the forearm of a user. In another preferred embodiment the the pivotal connecting structure includes a user adjustable tensioning mechanism to allow the user to adjust the force required to cause the forearm receiving and support structure to pivot. The tensioning mechanism preferably includes a wave spring positioned between a pivot plate and a clamping bracket that form a portion of the pivotal connecting structure. Providing an adjustable tensioning mechanism to allows the user to select the most comfortable tension setting and, thereby, reduce muscle strain and fatigue to a minimum. In another preferred embodiment, one or more pivot stops are provided to limit the range of angular motion between the forearm receiving and support structure and the drive shaft assembly of the weed trimming device.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

DESCRIPTION OF THE EXEMPLARY EMBODIMENT

Figure 1:
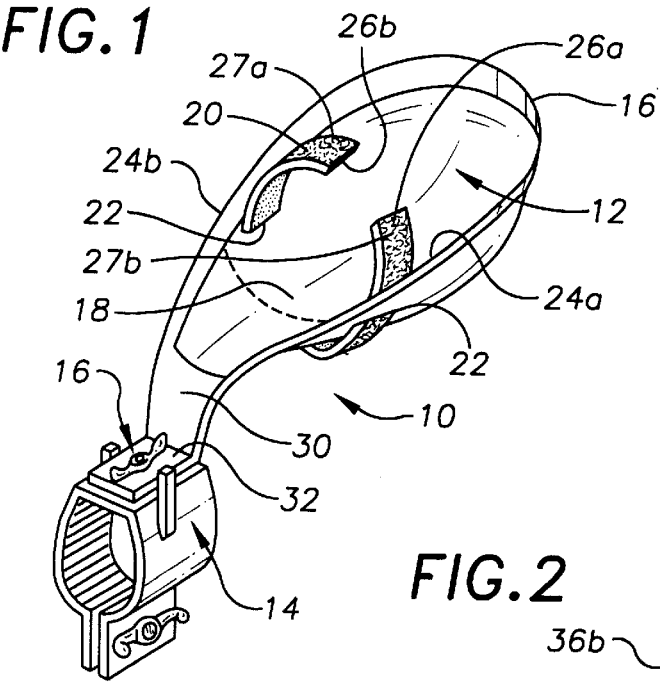
FIG. 1 is a perspective view of an exemplary embodiment of the pivoting forearm cradle for weed trimming devices of the present invention showing an exemplary contoured forearm receiving and supporting structure and an exemplary pivotal connecting structure including a user adjustable tensioning mechanism and a pair of pivot stops.

FIG. 1 shows an exemplary embodiment of the pivoting forearm cradle for weed trimming devices of the present invention, generally designated by the numeral 10. Forearm cradle 10 includes a contoured forearm receiving and supporting structure, generally designated by the numeral 12; a pivotal connecting structure, generally designated by the numeral 14; and a user adjustable tensioning mechanism, generally designated by the numeral 16.

In this embodiment, forearm receiving and supporting structure 12 is a cradle member 16 constructed from molded plastic having a contoured forearm receiving surface 18 into which the elbow and forearm of the user is positioned during use. Although cradle member 16 is constructed of plastic in this embodiment, other construction materials, such as metal, and construction methods, such as stamping can be used if desired. A strap assembly 20 is threaded through two strap apertures 22 provided adjacent to opposed side edges 24a, 24b. In use, strap ends 26a, 26b are positioned around the forearm of the wearer and attached together with hook and pile fasteners 27a,27b to securely hold the forearm of the wearer against forearm receiving surface 18 and provide a mechanism for allowing the user to provide a lifting force to the weed trimmer with the forearm.

Figure 2:
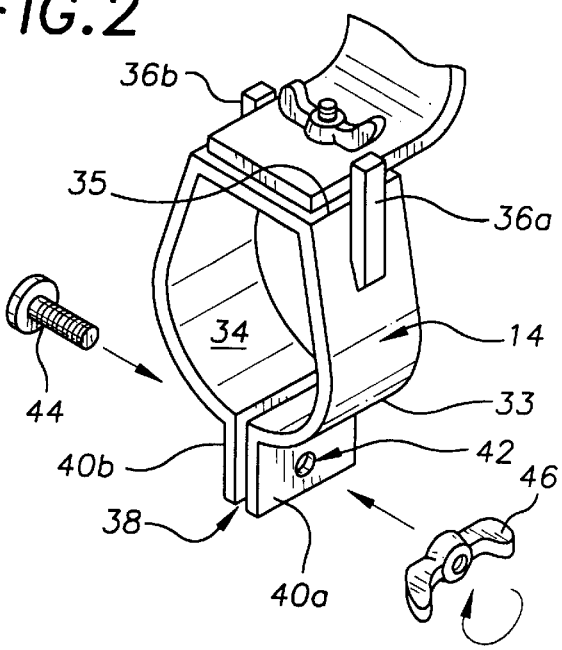
FIG. 2 is a detail perspective view of the pivotal connecting structure of FIG. 1 in isolation showing the clamping bracket defining a clamping barrel, the pivot stops; and the pivot plate, the tensioning bolt and the tensioning wing nut of the tensioning mechanism.

In this embodiment, a tapered connecting end 30 of cradle member 16 is integrally formed with a pivot plate 32 of the tensioning mechanism 16. With reference to FIG. 2, pivotal connecting structure 14 is molded from plastic and includes a clamping bracket 33 that defines a clamping barrel 34, a substantially planar pivot surface 35, a pair of pivot stops 36a,36b, a drive shaft insertion slot 38, a pair of securing tabs 40a,40b that are each provided with a securing aperture 42 (only one shown), and a securing assembly including a securing bolt 44 and a securing nut 46. Although pivotal connecting structure 14 is constructed of plastic in this embodiment, other construction materials, such as metal, and construction methods, such as stamping can be used if desired. Securing apertures 42 are concentrically aligned and are sized to allow an end of securing bolt 44 to pass therethrough for connection with securing nut 46 after a section of the drive shaft assembly is placed through drive shaft insertion slot 38 and into clamping barrel 34. Tightening securing nut 46 onto securing bolt 44 causing clamping bracket 33 to securely clamp and hold the drive shaft.

Figure 3:
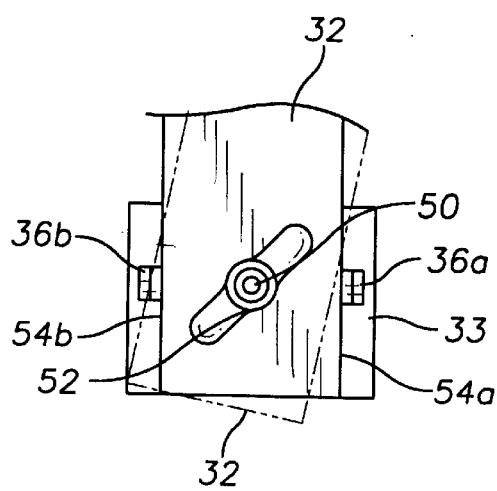
FIG. 3 is a top detail view showing the pivot plate in the centered position in unbroken lines and the pivot plate pivoted into a first stopping position in dashed lines.

Referring now to FIG. 3, pivot plate 32 is rotatably mounted to pivoting surface 35 (FIGS. 2 and 5) by a tensioning bolt 50 and a tensioning nut 52. Pivot plate 32 is free to pivot with respect to clamping bracket 33 until contact occurs between side edges 54a,54b and a pivot stops 36a,36b. In this embodiment pivot plate 32 is confined to about a forty-five degree range of angular rotation by pivot stops 36a,36b.

Figure 4:
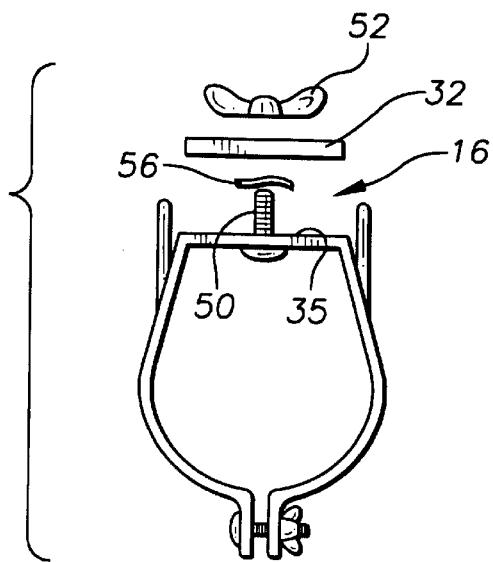
FIG. 4 is a partially exploded front plan view of the pivotal connecting structure showing the wave spring, the tensioning bolt, the tensioning wing nut, and the pivot plate of the tensioning mechanism and the two spaced pivot stops extending from the clamping bracket.
Figure 5:
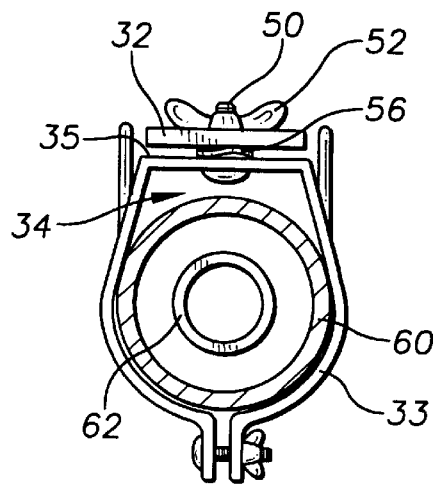
FIG. 5 is a front plan view showing a cross sectional view of a representative drive shaft of a weed trimmer clamped within the clamping barrel of the clamping bracket.

Referring now to FIG. 4, tensioning mechanism 16 includes pivoting surface 35, tensioning bolt 50, a spring washer 56, pivot plate 32, and tensioning nut 52. Referring now to FIG. 5, in this embodiment, spring washer 56 is positioned between pivoting surface 35 and pivot plate 32 and then tensioning nut 52 threaded onto the end of tensioning bolt 50 until spring washer 56 is partially compressed. Tightening tensioning nut 52 further increases the force required to cause pivot plate 32 to pivot. Loosening tensioning nut 52 reduces the force required to cause pivot plate 32 to pivot. It can be seen that by adjusting tensioning nut 52, the user can adjust the force required to cause cradle member 16 to pivot with respect to the drive shaft assembly. Providing a user adjustable tensioning mechanism allows the user to select the most comfortable working tension and further reduces strains to the user. Also shown in FIG. 5, is a representative drive shaft assembly 60 including a rotating drive shaft 62 clamped within clamping barrel 34 of clamping bracket 33.

Figure 6:
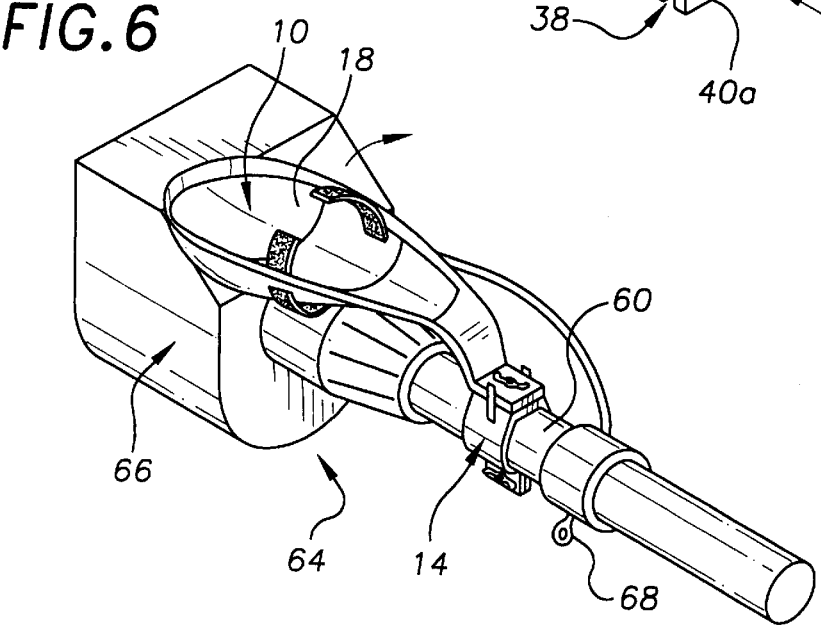
FIG. 6 is a perspective view of the pivoting forearm cradle of FIG. 1 attached to the elongated drive shaft of a representative weed trimmer.

FIG. 6 shows exemplary forearm cradle 10 of FIG. 1 attached with pivotal connecting mechanism 14 to elongated drive shaft 60 of a representative weed trimmer 64. Weed trimmer 64 includes a gasoline motor driven motor assembly 66 and a trigger control switch 68 for controlling the speed of motor assembly 66. In use, foreman receiving surface 18 provides a shielding structure between the forearm of the user and motor assembly 66.

It can be seen from the preceding description that a pivoting forearm cradle for a weed trimmer has been provided that includes an attachment mechanism for connection with the drive shaft assembly of a weed trimmer; that includes a pivoting mechanism that allows the forearm cradle to pivot with respect to the elongated drive shaft when in use; that includes a pivoting mechanism that includes a tensioning mechanism that allows the user to adjust the force required to cause the forearm cradle to pivot with respect to the elongated drive shaft; and that includes a shielding area for shielding the forearm of the user from contact with the motor assembly during use.

It is noted that the embodiment of the pivoting forearm cradle for weed trimming devices described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A pivoting forearm cradle for weed trimming device comprising:

a contoured forearm receiving and supporting structure including a cradle member having a contoured forearm receiving surface into which the elbow and forearm of a user are positioned during use and a strap assembly threaded through two strap apertures provided adjacent to opposed side edges of said cradle member;

a pivotal connecting structure in connection with said forearm receiving and support structure at one end thereof and attachable to a drive shaft assembly of a weed trimming device in a manner such that said forearm receiving and support structure is pivotal with respect to the drive shaft assembly, said pivotal connecting structure including a clamping bracket defining a clamping barrel, a substantially planar pivot surface, a pair of pivot stops, a drive shaft insertion slot, a pair of securing tabs that are each provided with a securing aperture, and a securing assembly including a securing bolt and a securing nut, said securing apertures being concentrically aligned and sized to allow an end of said securing bolt to pass therethrough for connection with said securing nut;

and a user adjustable tensioning mechanism in connection with said pivotal connecting structure, said user adjustable tensioning mechanism including a pivot plate rotatably mounted to said pivoting surface by a tensioning bolt and a tensioning nut, said pivot plate being free to pivot with respect to said clamping bracket until contact occurs between at least one side edge of said pivot plate and one of said pair of pivot stops, said tensioning mechanism further including a spring washer positioned between said pivoting surface and said pivot plate.

* * * * *